United States Patent [19]

Venkatram et al.

[11] Patent Number: 4,717,700

[45] Date of Patent: Jan. 5, 1988

[54] CATALYST DRYING AND ACTIVATION METHODS

[75] Inventors: Ramdas Venkatram, Morris Township, Morris County, N.J.; John C. Roarty, Baton Rouge, La.; Theodorus M. Wortel, Rhoon, Netherlands; James L. Carter, Savannah, Ga.

[73] Assignee: Exxon Research & Engineering Co., Florham Park, N.J.

[21] Appl. No.: 874,525

[22] Filed: Jun. 16, 1986

[51] Int. Cl.$^4$ .......................... B01J 29/06; B01J 37/00
[52] U.S. Cl. ........................................ 502/85; 502/66; 502/74
[58] Field of Search ............................. 502/66, 74, 85

[56] References Cited

U.S. PATENT DOCUMENTS

| | | | |
|---|---|---|---|
| 3,216,789 | 11/1965 | Breck et al. | 423/328 |
| 4,104,320 | 8/1978 | Bernard et al. | 208/138 |
| 4,544,539 | 10/1985 | Wortel | 423/328 |
| 4,568,656 | 2/1986 | Poeppelmeier et al. | 502/74 |
| 4,595,670 | 6/1986 | Tauster et al. | 502/66 |

*Primary Examiner*—Carl F. Dees
*Attorney, Agent, or Firm*—E. T. Wheelock; J. J. Mahon

[57] ABSTRACT

A zeolite-based catalyst containing a metal oxide or oxide complex is dried by heating while in contact with the gas. Heat input to the catalyst and hence the rate of catalyst temperature increase are controlled so as to limit the rate of water evolution from the catalyst and the water vapor concentration in the gas, thereby to maintain the metal oxide or complex in dispersed form within the pores of the zeolite.

29 Claims, No Drawings

CATALYST DRYING AND ACTIVATION METHODS

BACKGROUND OF THE INVENTION

The present invention relates to methods of drying and activating catalysts, particularly zeolite based catalysts.

Catalysts are widely employed in the petrochemical industry, particularly in reforming operations for converting normal paraffins and other less desired constituents of a hydrocarbon feedstock to desirable aromatic compounds. The catalysts employed for these purposes typically include a base and one or more metals, most typically platinum, dispersed on the base, and may also include a binder for physically supporting the base.

Reforming catalysts typically are prepared by depositing salts of the metal on the base and then calcining the base with the deposited salts in an oxidizing atmosphere to convert the metals to oxides and/or metallic oxide complexes including the metals, oxygen and other components, typically chlorine. The catalyst in this oxidized condition ordinarily is loaded into a reactor and contacted with hydrogen at an elevated temperature to reduce the metallic oxides or oxide complexes to free metal and thus bring the catalyst to its reduced or active state. In a typical reforming process, the hydrocarbon feedstock is passed through the reactor together with hydrogen at an elevated temperature. Under these conditions, some of the paraffins in the feedstock react to form the desired aromatic products upon contact with the reduced or activated catalyst. After the catalyst has been so employed for a prolonged period, it typically loses some potency and accordingly is regenerated by processes which may include exposing the catalyst to oxygen so as to burn off carbonaceous deposits accumulated on the catalyst during the process. The regenerated catalyst, once again in the oxidized state with the metals in the form of oxides or oxide complexes, is again reduced and the process is repeated.

The nature of the base and the distribution of the metal on and in the base can significantly affect the performance of the catalyst. Catalysts incorporating a zeolite base, notably a type L zeolite base may be employed in reforming operations as set forth in U.S. Pat. No. 4,104,320, the disclosure of which is incorporated by reference herein. A "type L zeolite" is a zeolite having a particular crystal structure as further set forth hereinbelow. Type L zeolite-based catalysts typically provide good selectivity and hence promote conversion of the feedstock to the desired aromatic products rather than less desired by-products. As set forth in copending, commonly assigned U.S. patent application Ser. No. 550,952, filed Nov. 10, 1983 (U.S. Pat. No. 4,595,668), the disclosure of which is also incorporated by reference herein, the activity and selectivity of a type L zeolite based catalyst are markedly improved by dispersing the metallic oxide or metallic oxide complex within the pores or channels of the zeolite so that, prior to reduction, the metallic oxide or oxide complex is disposed principally within the pores in the form of particles having a diameter of less than about 7 angstroms. Zeolite based catalysts have become increasingly important in reforming operations with the advent of the particular improved type L zeolites with a cylindrical morphology described in U.S. Pat. No. 4,544,539, the disclosure of which is also incorporated by reference herein. These zeolites provide, inter alia increased catalyst life in conjunction with the other benefits of type L zeolite catalyst bases.

Zeolite based catalysts, including the aforementioned type L zeolite based catalysts, typically are hygroscopic. Thus, although freshly calcined new catalyst is dry, the catalyst absorbs moisture when it is exposed to the ambient atmosphere, as during loading of the catalyst into the reactor. These catalysts will likewise absorb moisture if the reactor is opened to the atmosphere, as for service or repair of internal components. In many reforming operations the catalyst must be dry when contacted with the feedstock. Accordingly, there have been increasing needs for practical methods of drying a zeolite-based catalyst and for methods of reducing or activating such catalysts.

SUMMARY OF THE INVENTION

One aspect of the present invention provides drying methods. This aspect of the present invention incorporates the discovery that the performance of a zeolite based metal containing catalyst in use, in the reduced or active state, can be affected profoundly by the conditions employed in drying the catalyst while the catalyst is in an oxidized state. Although the present invention is not limited by any theory of operation, it is believed that improper drying can substantially destroy the desirable fine dispersion of the metal oxide or metal oxide complex so that when the catalyst is reduced, the resulting free or reduced metal is not distributed in the desirable, dispersed fashion within the pores of the zeolite. Water evolved in the form of vapor from the interior of the catalyst during the drying operation apparently tends to dislodge the metal oxide or metal oxide complex dispersed within the pores and hence tends to promote redistribution and/or agglomeration of the oxide or complex.

Regardless of the mechanisms actually involved in catalyst damage with improper drying, such damage is substantially avoided by the drying processes of the present invention. In a drying process according to this aspect of the invention, a moist zeolite-based catalyst having a metallic oxide or metallic oxide complex dispersed in the pores of the zeolite is dried by heating the catalyst while contacting the catalyst with a gas and limiting the rate of heat input to the catalyst so as to limit the rate of water evolution from the catalyst. Thus, the metallic oxide or complex remains dispersed after the heating step.

The concentration of water vapor in the gas phase in contact with the catalyst during the heating step preferably is also limited to about a predetermined maximum water vapor concentration, up to about 3000 vppm (parts per million by volume) or less and preferably less than 1500 vppm during the heating step, most preferably about 1500 vppm. It is believed that water vapor tends to mobilize the metallic oxide or complex within the zeolite structure. High water vapor concentration in the gas thus tends to promote redistribution and/or agglomeration of the oxide or complex. Limiting the water vapor concentration in the gas during the heating step retards such redistribution or agglomeration.

The gas preferably is substantially dry prior to contact with the catalyst. Thus, substantially all of the water vapor present in the gas during contact with the catalyst is the water vapor evolved from the catalyst itself. Preferably, the gas is contacted with the catalyst at a predetermined rate of gas flow per unit weight of catalyst or "weight space velocity." Thus, the water vapor concentration in the gas is limited by the limited rate of water evolution from the catalyst.

According to a further aspect of the present invention, the rate of water evolution from the catalyst, or a parameter directly related to the rate of water evolution is measured and the rate of heat input to the catalyst is controlled in response to such measurement.

The catalyst may be disposed in an enclosed reactor and contacted with the gas during the heating step by passing the gas through the reactor at the aforementioned predetermined "weight space velocity". Under these conditions, there is a predetermined relationship between water vapor concentration in the effluent gas stream leaving the reactor and the rate of water evolution from the catalyst. The rate of heat input may be controlled in response to the measured value of water vapor concentration in the effluent gas stream leaving the reactor.

Preferably, heat is supplied to the catalyst by a heat source in heat transfer relationship with the catalyst, such as the gas passing into the reactor or the walls of the reactor. The temperature of the heat source may be progressively increased during the heating step. In response to an increase in the water evolution rate, and hence an increase in the effluent water vapor concentration, the increase in the temperature of the heat source may be temporarily slowed or, preferably, halted. The increase in the temperature of the heat source may be accelerated or resumed in response to a decrease in the water evolution rate or effluent water vapor concentration. In a particularly preferred embodiment, heat is supplied to the catalyst by the gas and the inlet temperature of the gas supplied to the reactor is gradually increased. The increase in gas inlet temperature is temporarily interrupted when the effluent water vapor concentration rises to a predetermined target value, and resumed again when the effluent water vapor concentration drops below a predetermined trigger value.

This feedback control of the rate of increase in the temperature of the heat source compensates for the nonuniform water release properties of the zeolite. If the temperature of a zeolite is increased at a constant rate per unit time, the rate of water evolution per unit time typically increases to a peak value and then decreases again. With the feedback control procedures described above, the rate of temperature increase of the heat source, and hence the rate of temperature increase of the catalyst itself, are reduced as needed to compensate for this peaking effect and hence to limit the rate of water evolution from the catalyst.

Although the present invention is not limited by any theory of operation, one theoretical explanation for the effective control of water evolution rate provided by the feedback control arrangement relates to the heat balance of the catalyst. The rate of heat transfer from the heat source to the catalyst varies directly with the temperature difference between the heat source and the catalyst. As the temperature of the heat source is increased at a constant rate, the temperature of the catalyst tends to lag behind the temperature of the heat source. Absent evolution of water, the temperature difference between heat source and catalyst, and hence the rate of heat transfer to the catalyst, remain substantially constant. Evolution of water from the zeolite as vapor, however, requires conversion of sensible heat to latent heat of vaporization. Thus, as the catalyst reaches temperatures where substantial evolution of water vapor occurs, substantial quantities of heat are consumed within the catalyst in vaporization of water, which tends to retard the increase in the catalyst temperature. With continued constant-rate increase in the temperature of the heat source, the temperature difference between the heat source and the catalyst would increase, thereby increasing the rate of heat transfer to the catalyst and hence the rate of water evolution. In preferred embodiments of the present invention, however, the increase in the temperature or the heat source is slowed or arrested when the rate of water evolution increases, so as to limit or eliminate any increase in the temperature difference. Thus the rate of heat transfer to the catalyst, and consequently the rate of water evolution, are limited.

The gas employed in the heating step preferably is a nonreducing gas, most preferably an inert gas. Thus, the catalyst preferably is not exposed to reducing conditions while it still contains substantial moisture. This aspect of the present invention incorporates the discovery that exposure of a moist zeolite-based catalyst to reducing gases such as hydrogen may damage the catalyst, particularly when the catalyst is arranged in a deep bed.

The present invention further provides processes for activating a zeolite-based, metal-containing catalyst which is initially moist and which is initially in an oxidized state. In an activation procedure according to this aspect of the present invention, the catalyst is dried as set forth above and then reduced, preferably by contact with hydrogen. The drying and reduction operations preferably are conduced in the same reactor, typically the reactor in which the catalyst is employed. Water vapor evolution from the catalyst and/or the water vapor concentration in the reducing gas may be monitored and controlled during the reduction step.

Drying and activation procedures according to the present invention can be applied readily to catalysts in industrial scale reactors, and hence greatly enhance the utility of zeolite based metal containing catalysts in reforming and other operations.

The foregoing and other objects, features and advantage of the present invention will be more readily apparent from the detailed description of the preferred embodiments set forth below.

DETAILED DESCRIPTION OF THE PREFERRED EMBODIMENTS

In a process according to one embodiment of the present invention, the catalyst is in the form of pellets comprising zeolite crystals bound together by an inert binder. The zeolite crystals have platinum oxide dispersed within their pores, the major portion of the platinum oxide initially being disposed within the pores in particles smaller than about 7 angstroms. The pellets are loaded into a reactor of a type commonly utilized in reforming processes, the reactor having an inlet at an upstream end and an outlet at a downstream end. The pellets are disposed within the reactor in a deep bed. As employed in the present disclosure, the term "deep bed" means a bed of catalyst particles having a depth or upstream to downstream extent greater than about 50 times the mean particle size of the catalyst. Catalyst beds having a depth of about 300 to 2000 times the mean catalyst particle size are typically employed. For example, when using catalyst particles of about 0.062 inch, catalyst bed depths of about 2 to 10 feet are suitable.

As the catalyst pellets are handled and loaded into the reactor, the zeolite crystals absorb moisture. After loading, the reactor is closed and dry inert gas at about room temperature is passed through the reactor to purge the system. The catalyst is then dried by gradually heating it while passing further quantities of dry inert gas through the reactor in a single pass or once through flow at a constant rate and hence at a constant weight space velocity relative to the catalyst. Alternatively, the dry inert gas can pass through the reactor in recycle flow, with drying of the gas in the recycle loop and/or with purging of gas from the system and addition of fresh makeup gas.

The inlet temperature of the inert gas passing into the reactor is increased progressively at a predetermined rate so that heat is supplied to the catalyst by the gas. The "effluent water vapor concentration" or water vapor concentration in the gas stream leaving the reactor is monitored. During the initial stages of the heating process, the rate of water evolution from the catalyst, and hence the effluent water vapor concentration remain low. With continued increase in the inlet gas temperature, and continued increase in the catalyst temperature, there is an increase in the water evolution rate, and hence in the effluent water vapor concentration. When the effluent water vapor concentration reaches a predetermined target value, the increase in inlet temperature attained during the progressive increase. This constant inlet temperature operation is continued until the effluent water vapor concentration drops below a predetermined trigger value, less than the target value, whereupon the increase in the inlet temperature is resumed. The effluent water vapor concentration again increases to the target value, whereupon this cycle of operations is repeated. When a relatively high gas inlet temperature and hence relatively high catalyst temperature have been attained, the catalyst is substantially dry and the system enters a smooth operating mode. In this mode, the effluent water vapor concentration does not rise above the target value despite the continual increase in inlet gas temperature, and there is accordingly no need to interrupt the inlet gas temperature increase.

The heating operation is continued in the smooth mode until the inlet temperature reaches an elevated temperature suitable for reduction of the platinum oxide to free metallic platinum by contact with hydrogen, whereupon the flow of inert gas is terminated. Hydrogen is introduced to the reactor, initially in a single pass or once through flow at an inlet temperature identical to the last inlet temperature attained with inert gas. This once through flow of hydrogen is continued until the system has been substantially purged of nitrogen, whereupon the hydrogen flow is switched over to a recycle mode, in which the same hydrogen continually circulates through the reactor, with appropriate replenishment. Alternatively, reduction can be carried out using a mixture of hydrogen and nitrogen containing at least about 1% by weight of hydrogen. Water vapor is removed from the circulating hydrogen stream by contacting the hydrogen with suitable drying agents such as $Al_2O_3$, molecular sieves and the like. The inlet temperature of the hydrogen, and hence the temperature of the catalyst, are gradually increased during recycle operation. The hydrogen pressure in the system is likewise gradually increased. The effluent water vapor concentration in the hydrogen leaving the reactor is monitored and the increase in hydrogen temperature is interrupted if the effluent water vapor concentration reaches a target value and resumed when the effluent water vapor concentration drops below a trigger value. Ordinarily, however such increases in effluent water vapor concentration do not occur during the reduction step, so that the system operates in the smooth mode during reduction. After the reduction step, the catalyst is in an activated state, and may be employed in a reforming process by directing a hydrocarbon feedstock together with hydrogen through the reactor under known reforming conditions.

In the embodiment described above, heat is supplied to the catalyst during the drying operation by the inert gas entering the reactor. As the inlet temperature of the gas is progressively increased, heat is transferred from the gas to the catalyst. While the gas temperature is increasing, the inlet gas temperature is higher than the temperature of any portion of the catalyst bed. Accordingly, gas flowing downstream in the reactor first gives up some heat to the most upstream portion of the catalyst bed, and becomes progressively cooler as it passes downstream. There is accordingly a temperature gradient within the catalyst bed in the upstream to downstream direction. Thus, the temperature of the most upstream or hottest portion of the catalyst bed closely tracks the gas inlet temperature while the inlet temperature is increasing. When the hottest portion of the catalyst begins to evolve water vapor at a rapid rate, the increase in gas inlet temperature is interrupted in response to the resulting increase in the effluent water vapor concentration. During such a period of interruption, as the upstream regions of the catalyst bed attain temperatures close to the gas inlet temperature, the cooling effect of the upstream regions on the gas diminishes. Thus the gas reaching the more downstream regions of the catalyst bed becomes progressively warmer. The catalyst temperatures throughout the bed thus gradually approach the constant gas inlet temperature and the temperature gradient through the catalyst bed is progressively diminished. A similar temperature gradient smoothing effect may be obtained in other embodiments of the present invention, wherein heat is supplied to the catalyst from a heat source other than the gas, such as heated reactor walls or another heated solid body in heat transfer relationship with the catalyst. The temperature of the reactor wall or other solid body is progressively increased. There is a temperature gradient within the catalyst, those portions of the catalyst bed adjacent to the reactor wall or other solid heat source being hottest and most closely tracking the temperature of the wall or body. The increase in temperature of the wall or other solid body is temporarily interrupted or slowed in response to an increase in the rate of water evolution from the catalyst, so that the temperature gradient in the catalyst bed diminishes.

The present invention thus provides effective control of the rate of water evolution from the catalyst, and of the water vapor concentration in the gas in contact with the catalyst, even where the catalyst cannot be heated uniformly. Accordingly, drying methods of the present invention offer particularly significant advantages in drying zeolite based catalysts within industrial scale reactors, particularly where the catalyst is disposed in a deep bed within the reactor, as typically employed in reforming processes.

In the embodiment described above, the increase in gas inlet temperature is interrupted, and hence heat input to the catalyst is controlled, in response to measured values of effluent water vapor concentration during the heating step. As the incoming gas is substantially dry and the weight space velocity of the gas is constant during the heating step, the effluent water vapor concentration is substantially proportional to the total rate of water evolution from the catalyst. In variants of the feedback control arrangement, another parameter which is related to the rate of water evolution according to a known or constant relationship can be measured and the rate of heat input can be controlled in response to the measured value of such other parameter. Likewise, the rate of water evolution can be measured directly and the measured values can be utilized to control heat input. Measurement of the effluent water vapor concentration and feedback control responsive thereto are preferred, however. The effluent water vapor concentration provides a measure of the total water evolution rate from the entire catalyst bed. Accordingly, it is sensitive to water evolution from any part of the catalyst bed. Thus, feedback control utilizing effluent water vapor concentration effectively protects all portions of the bed from damage due to excessive water evolution rates despite nonuniformities in temperature and/or water evolution throughout the bed.

Moreover, feedback control of heat input based on measurement of the effluent water vapor concentration effectively protects the entire catalyst bed from exposure to excessive water vapor concentrations. The effluent water vapor concentration is the same as the water vapor concentration at the downstream end of the bed, where the water vapor concentration typically is highest. The water vapor concentration in the gas may be increased by an accidental reduction in gas flow rate, by accidental contamination of the incoming gas by water vapor from sources other then the catalyst or, in a recycle system, by failure of the gas drying or purge system. A feedback control system based on measured effluent water vapor concentration will compensate for these factors, and hence will effectively limit water vapor concentration in the gas.

In the embodiment described above, the catalyst is substantially dried before the reduction step. Thus, although there may be some minor amount of water evolution from the catalyst during the reduction step, such water evolution typically is insufficient to raise the water vapor concentration in the hydrogen stream to the target valve. A small amount of water is formed in the reduction step as a byproduct of the reaction between the hydrogen and the platinum oxide, but the rate of such formation typically is insufficient to adversely affect the catalyst. Ordinarily, the effluent water vapor concentration rises to the target value during reduction only if the hydrogen entering the reactor is contaminated with water vapor. Here again, feedback control of heat input based on effluent water vapor concentration compensates for any such unusual condition.

Catalyst drying methods according to the present invention, and catalyst activation methods according to the present invention which incorporate the drying methods of the present invention can be applied to zeolite based catalysts in industrial scale reforming reactors. Typically, the catalyst, after such industrial scale drying and reduction according to the present invention retains the excellent metal dispersion attained in laboratory scale processes involving mere reduction of freshly calcined, dry catalyst which has not absorbed moisture from the atmosphere.

The success of the drying and reduction processes in minimizing or eliminating catalyst damage due to displacement of the metal oxide or metal oxide complex can be determined by direct physical measurements of the metal dispersion in the catalyst after reduction, as by high resolution electron microscope measurements. The performance of the reduced catalyst may be evaluated by determining the activity and selectivity of the catalyst with a standardized feedstock. As used herein, the term "activity" refers to the percentage of a standard feedstock converted to a different product upon contact with the catalyst under standard conditions. The term "selectivity for aromatics" refers to the proportion of the converted feedstock which is converted to the desired aromatic products, rather than to undesired byproducts. Typically, both activity and selectivity for aromatics vary directly with dispersion of the metal in the catalyst. The directly measured dispersion, and the activity and selectivity of the catalyst may be compared with similar parameters for a dry catalyst activated in a laboratory scale procedure which does not entail absorption of water and hence does not entail a drying step. The extent to which metal dispersion is maintained uniformly throughout an industrial scale catalyst bed during drying and activation procedures according to the present invention can be determined either by taking samples from various regions of the bed and subjecting each individual sample to dispersion, activity and/or selectivity measurements, or by observing the performance of the catalyst in various regions of the bed during an actual reforming operation in the industrial reactor. Typically, the reforming reactions are endothermic, and the endotherm or amount of heat consumed per unit catalyst provides an indirect measure of activity. In a catalyst bed with uniform metal dispersion in the zeolite at all locations within the bed, the endotherm will vary with the reactant concentrations and with temperature prevailing in various regions of the bed according to the Arrhenius relationship. Similar test procedures may be applied to catalysts for use in operations other than reforming.

Catalysts based on type L zeolite are preferred in practice of the present invention. The crystal structure and preparation of certain type L zeolites are described in U.S. Pat. No. 3,216,789. Preferably, the type L zeolites employed in the present processes are type L zeolites with cylindrical morphology as disclosed in U.S. Pat. No. 4,544,539, the disclosure of which is incorporated by reference herein. As set forth in greater detail in the U.S. Pat. No. 4,544,537, the preferred zeolites have a characteristic X-ray diffraction pattern obtained from CuK$\alpha$ radiation with the significant d (Angstroms) values set out in Table A:

TABLE A 16.1±0.4

7.52±0.05

6.00±0.04

4.57±0.04

4.35±0.04

3.91±0.02

3.47±0.02

3.28±0.02

3.17±0.02

3.07±0.02

2.91±0.02

2.65±0.02

2.46±0.02

2.42±0.01

2.19±0.01

The preferred cylindrical zeolites according to the U.S. Pat. No. 4,544,539 are preferably aluminosilicates and will be described hereinafter in terms of aluminosilicates, though other elemental substitutions are possible, for example aluminum may be substituted by gallium, boron, iron and similar trivalent elements, and silicon may be substituted by elements such as germanium or phosphorus. The aluminosilicates preferably have a composition (expressed in terms of molar ratios of the constituent oxides in anhydrous forms) of:

$(0.9-1.3)M_{2/n}O:Al_2O_3:xSiO_2$ wherein M is a cation of valence n, x is from 5 to 7.5, preferably from about 5.7 to about 7.4, more preferably from about 6 to about 7 and most preferably from about 6.0 to about 6.5. The preferred zeolites have high crystallinity as shown by a well-defined X-ray diffraction pattern (without binder or other diluents present) with sharp peaks.

The exchangeable cation M in the above general formula is very preferably potassium, but it is possible for a part of M to be replaced by other cations such as alkali and alkaline earth metals for example sodium, rubidium or caesium. The ratio $M_{2/n}O:Al_2O_3$ is preferably from about 0.95 to about 1.15, and generally above 1.

The aluminosilicate form of the zeolite may be hydrated, typically with from 0 to about 9 moles of water per mole of $Al_2O_3$. When used as a catalyst base, as described hereinafter, the zeolite is preferably first calcined to remove water. In normal preparation from aqueous gels a hydrated form is first prepared and this may be dehydrated by heating.

Scanning electron micrographs (SEM) of the preferred zeolites show these to have very distinct crystal morphology. Preferred zeolites appear as distinct cylinders in scanning electron micrographs. The terms "cylinder" and "cylindrical" are used herein to described particles having substantially the shape of a cylinder as defined in solid geometry--that is, a solid bounded by a surface generated by a line moving parallel to a fixed line so as to cut a fixed plane curve and by two parallel planes (bases) which cut the surface. The use of these terms is not intended to exclude particles having generally cylindrical form but having minor surface irregularities or displaying typical crystallographic faults or dislocations. The cylindrical particles of the invention are preferably substantially in the form of circular cylinders and most preferably substantially in the form of right circular cylinders. Particularly preferred cylindrical particles are those having an aspect ratio (the length of the cylinder surface to the diameter of the cylinder) of at least 0.5. Particles having a lower aspect ratio are also described as discs where they have substantially flat basal planes. The aluminosilicate zeolites are preferably characterized by at least about 50%, more preferably about 70% and most preferably about 85%, of the crystallites being cylinders. The aspect ratio of the cylindrical crystallites is preferably from about 0.5 to about 1.5.

The mean diameter of the preferred zeolite cylinders or crystallites is at least about 0.1 micron, preferably at least about 0.5 micron, more preferably from about 0.5 to about 4 microns, and most preferably from about 1.0 to about 3.0 microns. Preferably substantially all the cylindrical particles of zeolite fall within the range of from 0.5 to 4 microns.

The zeolite with cylindrical morphology may be prepared by controlling the composition of the reaction mixture used to prepare the zeolite within certain limits, depending upon the aspect ratio required. In preparing the preferred zeolites, an alkaline reaction mixture comprising water, a source of silicon and a source of aluminum with a composition falling within the following molar ratios (expressed as oxides):

$M_2O/SiO_2$:0.22–0.36

$H_2O/M_2O$:25–90

$SiO_2/Al_2O_3$:6–15

(wherein M is a cation of valence n, and preferably potassium or a mixture of K+M' in which M' is an alkali metal or alkaline earth metal such as sodium, calcium, barium, or rubidium, provided that $K_2O/(M'_2O+K_2O)$ is at least 0.7) is heated to a temperature of from at least 75° C. and preferably from about 100° C. to about 250° C., more preferably from about 120° C. to about 225° C., to form the desired cylindrical aluminosilicate.

The ratio of $H_2O/(K_2O+M'_2O+SiO_2+Al_2O_3)$ is preferably greater than 6 and most preferably greater than 8.

Preferred zeolites may be obtained within the following preferred ranges:

$K_2O/SiO_2$:0.24–030

$H_2O/K_2O$:35–65

$SiO_2/Al_2O_3$:8–12

In particular, an optimum composition for a process in which the reaction mixture is heated to from about 120° C. to about 225° C. has been found to be substantially in the following mole ratios:

2.62 $K_2O:Al_2O_3:10SiO_2:160H_2O$

Particle size is also affected by the composition of the reaction mixture; larger particle sizes are favoured by each of lower alkalinity, higher dilution and higher temperatures. The crystallization is preferably carried out in the region of 150° C. for about 24 to 96 hours, typically from 48 to 72 hours. The crystallization is generally carried out in a sealed autoclave and thus at autogenous pressure. It is possible to employ higher pressures. Lower pressure will require longer crystallization times. Following the preparation as described above the aluminosilicate or zeolite may be separated, washed and dried in the normal manner.

A zeolite based, metal-containing catalyst, as employed in processes of the present invention, is made by loading metal or metals such as one or more group VIII metals into the pores of the zeolite. The group VIII metal may be selected from the group consisting of nickel, ruthenium, rhodium, iridium, palladium, platinum and combinations thereof. Preferably, the metal is or includes platinum, typically about 0.3 to about 1.5% platinum by weight based on the weight of the zeolite, and is loaded into the zeolite by a process as disclosed in U.S. Pat. No. 4,568,656, the disclosure of which is incorporated by reference herein.

In the loading process of the '656 patent, the zeolite, typically in a matrix of comprising zeolite crystals and a binder, is contacted with an aqueous loading solution containing a platinum salt and a non-platinum metal salt, aged to distribute the platinum salt within the pores of the zeolite, dried and then calcined to convert the platinum salt to platinum oxide.

The quantity of non-platinum metal salt in the loading solution is critical in assuring that acid sites will not be formed on the catalyst during subsequent drying, calcination and reduction. In addition, the quantity of non-platinum metal salt in the loading solution avoids an excess of metal ions in the form of a salt which could block the passage of hydrocarbons through the pores of the zeolite.

The amount of loading solution to be used (defined as Z) is in excess of that which is required to fill the total pore volume of the carrier to incipient wetness (defined as X, where Z is always greater than X). The amount of non-platinum metal salt (defined as A) is initially present in combination with the platinum source in the loading solution such that after loading, the initial amount of non-platinum metal salt (A) plus the amount of non-platinum metal salt added to the solution by ion-exchange between the platinum source and the zeolite (defined as $A^1$) is present in the loading solution (Z) in a concentration $(A+A^1)/z$ equal to the concentration $A^1/X$ of non-platinum metal salt added to the solution by ion-exchange between the platinum source and the zeolite at incipient wetness within a range:

$$(A+A^1)/Z = 0.3\ A^1/X \text{ to } 1.2\ A^1/X$$

The excess liquid is removed from the carrier and the solids are subsequently aged for a time and temperature effective to allow the platinum to migrate and uniformly distribute throughout the zeolite. The aged zeolite is then dried and calcined to convert the platinum to platinum oxide.

The type L zeolite based catalysts typically release substantially all of the water initially absorbed on the zeolite as the catalyst is heated above about 110° C. The greatest water evolution typically occurs at about 160° C., lesser amounts of water being evolved at higher temperatures up to about 250°–260° C. Such catalysts are typically dried by heating from about 110° C. or below to at least about 200° C., preferably to at least about 230° C., and most preferably to at least about 250° C. while in contact with the inert gas, and then reduced in contact with hydrogen at about 250° C. to about 450° C. If desired, the drying step may be continued, with continued heating in the inert gas, until the gas inlet temperature reaches about 340° C. to about 350° C. or more. Although some minor amount of water may remain in the catalyst after the drying step, such minor amounts typically are insufficient to cause damaging rates of water evolution upon subsequent further heating during the reduction step.

The reduction step preferably follows immediately after the drying step. However, the catalyst may be allowed to cool after drying and reheated to reduction temperatures while in contact with hydrogen. In such a process, the catalyst should be protected from moisture between the drying and reduction steps. With a type L zeolite based catalyst, the inlet gas temperature preferably is increased at the rate of about 28° C. per hour or less during the drying step, and the inlet gas temperature increase may be interrupted when the effluent water vapor concentration reaches the preferred target value of about 1500 vppm or parts per million by volume. The increase in inlet gas temperature may be resumed when the effluent gas concentration drops to a trigger value of about 500 vppm or less. During the reduction step, the inlet hydrogen temperature may be increased at the rate of about 42° C. per hour or less, and the same target and trigger values of effluent water vapor concentration may be employed. Nitrogen is the preferred inert gas for use in the drying step. The average rate of water evolution from the catalyst, based on the total net weight of the catalyst in the reactor, is preferably limited to about 0.67 and more preferably about 0.50 parts by weight water per hour or less per 100 parts by weight catalyst. As used herein with reference to a catalyst, the term "net weight" refers to the weight of the catalyst exclusive of binders. The term "gross weight" refers to the weight of the catalyst including the binder.

Certain aspects of the present invention are illustrated by the following example:

EXAMPLE 1

A catalyst comprising a type L zeolite with cylindrical morphology according to U.S. Pat. No. 4,544,539 and about 25% by weight of an inert binder comprising $Al_2O_3$ is loaded with tetraaminc platinum (II) chloride according to the procedure set forth in U.S. Pat. No. 4,568,656 and calcined as set forth in that application. The calcined catalyst is substantially dry.

The dry calcined catalyst is divided into large aliquots A and B and small aliquot C. Aliquot A is loaded into an industrial scale reforming reactor as a deep bed and absorbs about 10% by weight moisture based on the gross weight of the catalyst during handling operations. After loading, the reactor is closed and purged with dry nitrogen. To dry the catalyst, dry nitrogen is passed through the reactor at a weight space velocity of about 5 parts by weight nitrogen per hour per part by weight catalyst, based on gross weight, under a pressure of about 345 KPa absolute. The effluent water vapor concentration is measured in the nitrogen stream discharged from the outlet at the downstream end of the reactor. The inlet temperature of the nitrogen entering the upstream end of the reactor is initially about 37° C., and is increased at the rate of about 27° C. per hour. The increase in inlet nitrogen temperature is interrupted when the effluent water vapor concentration reaches 1500 vppm and resumed when the effluent water vapor concentration drops to 500 vppm. After the inlet nitrogen temperature reaches 230° C., nitrogen flow is terminated and replaced by dry hydrogen in a once through or single pass flow at a weight space velocity of about 0.6 parts by weight hydrogen per hour per part by weight catalyst, based on the gross weight of the catalyst. After the system has been substantially purged of nitrogen, the hydrogen flow is shifted to recycle mode at a weight space velocity of about 1.5, the pressure within the reactor is gradually increased to about 1138 KPa absolute and the hydrogen inlet temperature is increased at the rate of about 42° C. per hour until the inlet temperature reaches about 450° C., whereupon the catalyst is fully reduced and ready for use in contact with feedstock within the reactor.

In use, a hydrocarbon feedstock comprising about 56% $C_6$ hydrocarbons and about 44% $C_7$ hydrocarbons is passed through a reactor at an inlet temperature of about 471° C. and a weight hourly space velocity of about 6.4 based on catalyst gross weight with hydrogen at a 6:1 molar ratio of hydrogen to feedstock. Good conversion of the feedstock to aromatic products including benzene, toluene, and $C_8+$ aromatics is obtained, indicating that the catalyst, after drying and reduction, has platinum well dispersed in the pores of the zeolite. The endotherm at various locations in the catalyst bed during the reforming operation, closely follows the predicted pattern based on reactant concentrations at different locations within the bed and based on the Arrhenius relationship with respect to the temperatures prevailing at different locations within the bed, indicating that the dispersion of metal within the zeolite is substantially uniform throughout the catalyst bed.

Samples of the catalyst are taken after the reduction step, but before contact with the feedstock, from the downstream end of the catalyst bed, where metal dispersion is typically poorest. These samples are subjected to high resolution electron microscopy and tested for activity and selectivity to aromatics by contacting the samples in a laboratory scale reactor with normal heptane at a temperature of 500° C., a weight space velocity of 20 parts by weight heptane per parts by weight catalyst based on the gross weight of the catalyst, and a 6:1 hydrogen:heptane molar ratio.

Aliquot B of the same calcined catalyst is loaded, dried and reduced in the same industrial scale reactor as utilized for aliquot A, utilizing the same conditions, and provides substantially the same results in a reforming operation conducted in the reactor. Samples of the reduced catalyst from aliquot B, prior to its contact with feedstocks, are taken and tested for activity and selectivity in substantially the same fashion as with aliquot A.

Smaller aliquot C of the same dry, calcined catalyst is loaded into the laboratory reactor used for the activity and selectivity tests, reduced in that reactor and subjected to the same activity and selectivity tests as used applied to aliquots A and B.

The reduced catalysts of aliquots A and B both exhibit good dispersion of reduced platinum within the zeolitic pores when examined by high resolution micron microscopy. The activity and selectivity test results, set forth in table B, below, demonstrate further that the catalysts of aliquots A and B, dried and reduced on an industrial scale in an industrial scale reactor have properties equal to or superior to those of aliquot C, handled solely by laboratory methods. Moreover, the consistently good results achieved with both aliquots A and B demonstrate the repeatability and consistency of the drying and reduction procedures according to the present invention.

TABLE B

|  | Aliquot | | |
|---|---|---|---|
|  | A | B | C |
| Conversion, % by weight of feedstock converted to products other than heptane | 70 | 68 | 65 |
| Toluene yield, (% toluene in total product by weight) | 46 | 42 | 41 |
| Selectivity, (toluene yield divided by conversion, %) | 66 | 63 | 64 |

What is claimed is:

1. A method of drying a moist catalyst including a zeolite and a metallic oxide or metallic oxide complex dispersed in the pores of said zeolite comprising heating said catalyst while contacting said catalyst with a gas, and limiting the rate of heat input to said catalyst to thereby limit the rate of water evolution from said catalyst during said heating step so that said metallic oxide or metallic oxide complex remains dispersed after said heating step.

2. A method as claimed in claim 1 including the step of controlling the gas flow so that the gas is contacted with the catalyst at a space velocity during said heating step and the water vapor concentration in said gas during contact with the catalyst is thereby limited by the rate of water evolution from the catalyst during said heating step.

3. A method as claimed in claim 2 wherein said zeolite is a type L zeolite.

4. A method as claimed in claim 3 wherein said zeolite is a zeolite having an X-ray diffraction pattern obtained from CuFα radiation with significant d values set out in Table A hereinbefore and comprising highly crystalline crystallites having at least about 50% of its crystallites in the form of distinct circular cylinders with an aspect ratio of at least 0.5 and with a mean diameter of at least 0.5 micron.

5. A method as claimed in claim 4 wherein said metallic oxide or metallic oxide complex includes at least one group VIII metal.

6. A method as claimed in claim 5 wherein said at least one group VIII metal includes platinum.

7. A method as claimed in claim 6 wherein the rate of water evolution from said catalyst is limited during said heating step to about 0.67 parts by weight water per part by weight of said catalyst per hour or less, based on the net weight of said catalyst.

8. A method as claimed in claim 7 wherein said gas contacted with the catalyst during said heating step is an inert gas.

9. A method of activating a catalyst comprising drying the catalyst by a method as claimed in claim 8 and reducing said metallic oxide or metallic oxide complex in said dried catalyst after said heating step.

10. A method as claimed in claim 9 wherein said heating step is continued until the temperature of said catalyst reaches at least about 200° C. while maintaining said catalyst in contact with said inert gas.

11. A method of drying a zeolite-based catalyst comprising heating said catalyst while contacting said catalyst with a gas, measuring the rate of water evolution from said catalyst or a parameter directly related to said rate of water evolution, and controlling the rate of heat input to said catalyst in response to said measurement so as to limit the rate of water evolution from said catalyst.

12. A method as claimed in claim 11 including the step of controlling the gas flow so that the gas is contacted with the catalyst at a space velocity during said heating step and the water vapor concentration in said gas during contact with the catalyst is hereby limited by the rate of water evolution from the catalyst during said heating step.

13. A method as claimed in claim 12 wherein said catalyst is disposed in an enclosed reactor and including the step of measuring the effluent water vapor concentration in the gas passing out of said reactor and controlling heat input to said catalyst in response to said measured effluent water vapor concentration.

14. A method as claimed in claim 13 wherein heat is supplied to the catalyst by a heat source in heat transfer relationship with the catalyst, the temperature of said heat source is progressively increased, said progressive increase is slowed or halted temporarily in response to an increase in said measured effluent water vapor concentration and accelerated or resumed in response to a decrease in said measured effluent water vapor concentration.

15. A method as claimed in claim 14, wherein said heat source includes the gas supplied to said reactor, the inlet temperature of the gas passing into the reactor is gradually increased and the increase in inlet temperature is temporarily interrupted in response to an effluent water vapor concentration and resumed when the effluent water vapor concentration drops below said previously measured effluent water vapor.

16. A method as claimed in claim 15 wherein said zeolite-based catalyst includes a metal oxide or metal oxide complex dispersed in the pores of said zeolite, said metal oxide or metal oxide complex remaining dispersed after said heating step.

17. A method as claimed in claim 16 wherein said zeolite is a L zeolite.

18. A method as claimed in claim 16 wherein said zeolite is a zeolite having an X-ray diffraction pattern obtained from $CuK_d$ radiation with significant d values set out in Table A hereinbefore and comprising highly crystalline crystallites having at least about 50% of its crystallites in the form of distinct circular cylinders with an aspect ratio of at least 0.5 and with a mean diameter of at least 0.5 micron.

19. A method as claimed in claim 18 wherein said metallic oxide or metallic oxide complex includes at least one group VIII metal.

20. A method as claimed in claim 19 wherein said at least one group VIII metal includes platinum.

21. A method as claimed in claim 20 wherein said effluent water vapor concentration is about 3000 vppm or less.

22. A method as claimed in claim 21 wherein said effluent water vapor concentration is about 1500 vppm.

23. A method as claimed in claim 22 wherein said effluent water vapor concentration is about 500 vppm.

24. A method as claimed in claim 21, wherein the inlet temperature of the gas is gradually increased at the rate of about 28° C. per hour or less.

25. A method as claimed in claim 16 wherein said gas passed through said reactor during said heating step is an inert gas.

26. A method of activating a catalyst comprising drying the catalyst by a method as claimed in claim 25 and reducing said metallic oxide or metallic oxide complex in said dried catalyst after said heating step.

27. A method as claimed in claim 26 wherein said reducing step includes the step of passing hydrogen through said reactor.

28. A method as claimed in claim 27 wherein said heating step is continued until the temperature of said catalyst reaches at least about 200° C. while maintaining said catalyst in contact with said inert gas.

29. A method as claimed in claim 28 wherein said heating step is continued until the temperature of said catalyst reaches at least about 250° C. while maintaining said catalyst in contact with said inert gas.

* * * * *

UNITED STATES PATENT OFFICE
CERTIFICATE OF CORRECTION

Patent No. 4,717,700                             Dated January 5, 1988

Inventor(s) Ramdas Venkatram, John C. Roarty, Theodorus M. Wortel, James L. Carter It is certified that error appears in the above-identified patent and that said Letters Patent are hereby corrected as shown below:

Claim 7, column 14, line 50 - Delete "part" and insert "100 parts".

Signed and Sealed this

Fourteenth Day of June, 1988

*Attest:*

DONALD J. QUIGG

*Attesting Officer*    Commissioner of Patents and Trademarks